July 19, 1932. G. B. WATKINS 1,867,787
LAMINATED GLASS AND PROCESS OF PRODUCING THE SAME
Filed April 12, 1929
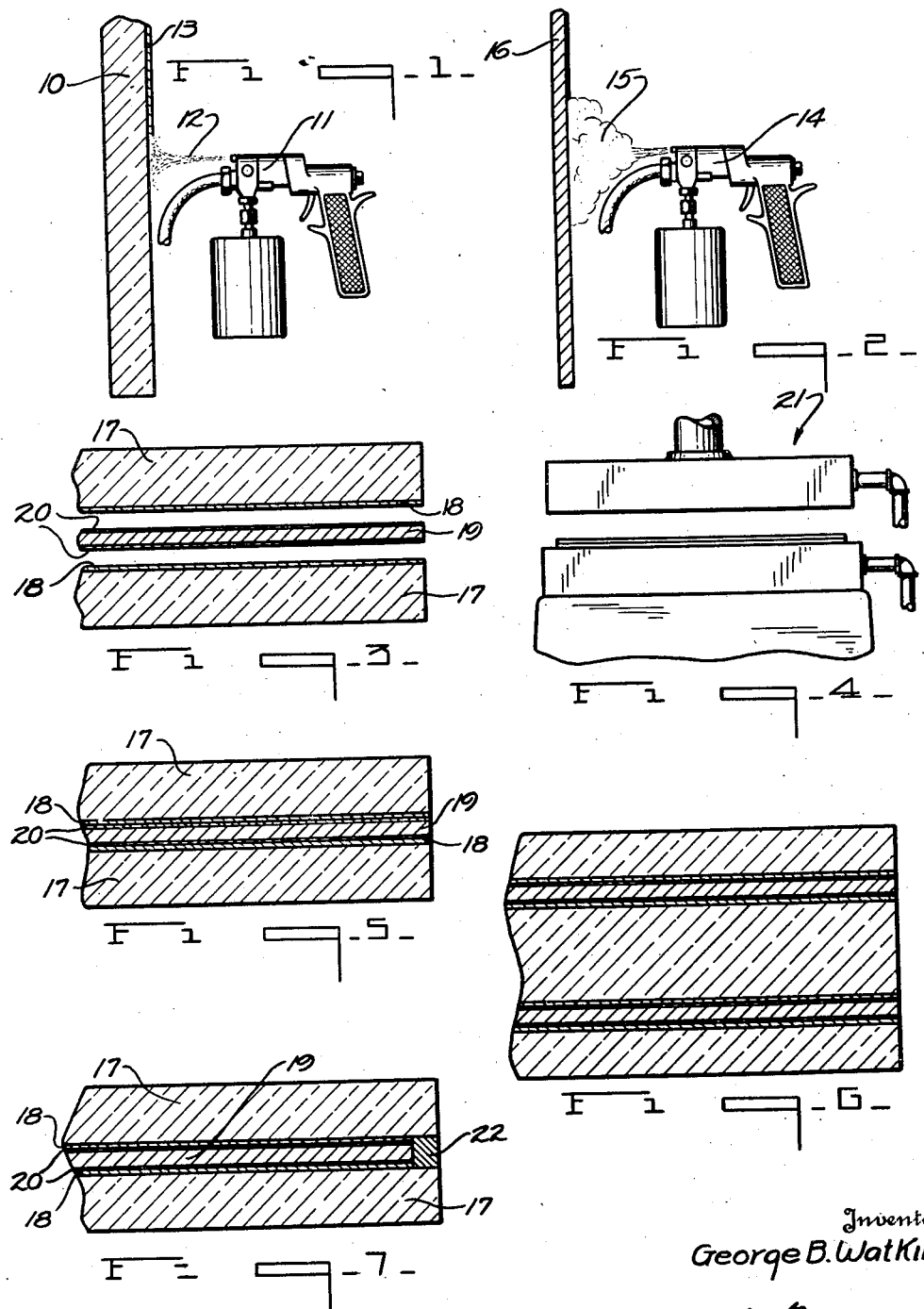
Inventor
George B. Watkins
By Frank Fraser
Attorney Patented July 19, 1932

1,867,787

UNITED STATES PATENT OFFICE

GEORGE B. WATKINS, OF TOLEDO, OHIO, ASSIGNOR TO LIBBEY-OWENS-FORD GLASS COMPANY, OF TOLEDO, OHIO, A CORPORATION OF OHIO

LAMINATED GLASS AND PROCESS OF PRODUCING THE SAME

Application filed April 12, 1929. Serial No. 354,482.

The present invention relates to laminated glass and to the process of producing the same.

Laminated or composite glass is commonly called in the art "non-shatterable" or "non-scatterable" glass. Such glass is ordinarily produced by uniting two or more sheets or plates of glass and one or more non-brittle membranes. The value of such a composite sheet of glass is dependent to a considerable degree upon the quality and permanency of the bond between the several laminations. It is essential that the bond be such that one or more of the glass sheets can be broken or shattered without separating from the non-brittle portion. The bond between the laminations, to be satisfactory from a commercial standpoint, must be such that it will not be adversely affected by climatic conditions encountered in actual use.

Regular commercial plate glass, regardless of the process by which it is made, contains at least some apparent waves. These waves are not ordinarily objectionable when such glass is used in single sheets and vision therethrough is relatively free from distortion. It has been found, however, that when such glass is used in the production of laminated glass by some processes, the waves are either accentuated, new waves introduced, or both.

It has also been found that laminated glass produced in accordance with some processes, subsequent to its manufacture, frequently develops a separation of the glass from the non-brittle substance. This condition is commonly referred to as "let-goes". They may occur around the marginal portions of the sheet and work inwardly thereof or may occur in any part of the composite sheet. The "let-goes" result from a breaking down of the bond between the laminations so that at the point of the let-go there is no further bond or union.

It has also been noticed that an undesirable condition may present itself in the composite sheet due to the appearance of bubbles. To unite two sheets of glass and a sheet of non-brittle material in a manner that an apparently excellent bond is obtained between the various laminations, offers no grave problem. That is, laminations can be bonded together by the aid of some binding material, the bond between the laminations to all intents and purposes appearing satisfactory upon the completion of the composite sheet at which time the composite sheet may be devoid of bubbles, let-goes, etc. If an improper bond inducing medium is used, such as one having a relatively low boiling point for instance, the non-brittle material or membrane used will have a tendency to extrude from between the glass during the pressing operation which sets up internal strains in the finished composite sheet, frequently causing the finished product to develop so-called "after cracks", that is, a breakage of one or more of the glass sheets.

The present invention contemplates the use of a bonding material or medium, or bond inducing medium for the various laminations which will produce a finished product or composite sheet adapted for general use under varying climatic conditions without developing undesirable defects such as bubbles, let-goes, and after cracks as pointed out above. With a bonding medium of this character, two or more sheets of glass and one or more membranes formed from a cellulose composition material or the like can be united, preferably under the combined action of heat and pressure, in a manner that a satisfactory bond will result.

The process is also such and the ingredients of a character that the finished product will not present an undesirable wavy condition when viewed at an angle (the customary way of examining glass) as the process and ingredients when applied in accordance with the present invention will tend to reduce the appearance of waves in the finished sheet to a minimum.

Other objects and advantages of the invention will become more apparent during the course of the following description when taken in connection with the accompanying drawing.

In the drawing wherein like numerals are employed to designate like parts throughout the same, Fig. 1 is a diagrammatic view illustrating the spraying of a solution upon a sheet of glass, Fig. 2 is a similar view illustrating the spraying of a solution upon a sheet of non-brittle plastic material, Fig. 3 is a fragmentary sectional view illustrating the various laminations in proper superimposed relationship before they have been united, Fig. 4 is a diagrammatic representation of a form of press that may be used, and Figs. 5, 6, and 7 are fragmentary sectional views of different forms of finished product.

Referring to the drawing, the numeral 10 designates a sheet of preferably transparent glass whose surfaces may be ground or polished, or not, as desired. If laminated glass is made from sheet glass, whose surfaces have been ground and polished, it is rather expected that the sheet of laminated glass will not be of exact uniform thickness throughout. If, on the other hand, the laminated glass is produced from plate glass, whose surfaces have been ground and polished, the purchaser expects a sheet of laminated glass substantially uniform throughout its entire thickness and with very little, if any, wavy appearance.

I have found that all commercial plate glass is wavy to a slight degree at least. It will be understood that when speaking of waves and other irregularities in the glass sheets and laminated sheet, the terms are relative and even slight deflections in the surface of the glass are considered as giving a wavy condition.

In the past it does not seem that the plate glass manufacturers have been worried over this condition because a single sheet of plate glass ordinarily appears, when used alone, to the laymen at least, perfectly uniform in thickness and devoid of surface irregularities. I have found, however, that when two or more sheets of plate glass are used in the production of laminated glass, the finished composite structure will, in a great many instances, appear more wavy than either of the two sheets when examined alone. I have also determined that the method and ingredients used in the manufacture of the composite sheet has, to a considerable extent, an influence on the appearance of the finished sheet. The wavy appearance is not ordinarily noticeable when viewing the sheet in a line substantially at right angles to the surfaces of the sheets. The sheet is usually examined for this wavy condition, however, at a point almost in line with the edge of the sheet.

The numeral 11 designates a spray gun which is used to cause a spray 12 of material directed against the surface of the glass 10 to form a deposit 13 thereon. Although the sheet of glass 10 is illustrated in an upright position, it will, of course, be appreciated that the sheet may be disposed in a horizontal plane, inclined plane, or in any other desired position during the spraying operation.

In Fig. 2 the spray gun 14 is used to spray a fine mist of a suitable solution 15 upon the surfaces of the non-brittle plastic sheet 16. A cellulose composition material may be used as the member 16, and if such type of material is used, it is preferred that it be properly seasoned, etc., before being used.

The solution used is preferably formed from a synthetic resin and a polyglycol derivative. A resin of polyhydric alcohol-polybasic acid formed from succinic acid has been found very desirable. The resin may be treated in the following manner: During the making of the resin such as by boiling succinic acid and glycerol together, the reaction can be momentarily stopped, and a mixture of 40% resin and 55% diethyl oxalate may be produced and heated to further the reaction of the resin. It has been found that the reaction of the resin can be more readily controlled if it is carried on in diethyl oxalate. 5% cello-solve may then be added to place the resin in proper solution. This mixture may then be kept this way indefinitely.

The final solution is made by taking 50% of the above resin solution and mixing it with 50% of a polyglycol derivative such as monobutyl ether of diethylene glycol or monoethyl ether of diethylene glycol. The resultant mixture may then be applied to the glass sheet 10 and the non-brittle sheet 16 as above described.

As soon as the sheets of material have been properly coated with this solution, the various laminations are arranged in their intended superimposed relationship as indicated in Fig. 3. In Fig. 3, it will be seen that the glass sheets 17 each have a film of liquid 18 thereon, while the non-brittle plastic sheet 19 is provided with two films of liquid 20. Although the laminations are shown in spaced relation in Fig. 3, in actual practice the laminations are pressed together and then placed in the press designated in its entirety by the numeral 21. The sandwich formed by the superimposed laminations is preferably interposed between pieces of resilient material such as blotting paper, etc., and flexible metallic plates are provided to facilitate insertion and removal of the sandwich into and out of the press. The sandwich may be subjected to a pressure of about 200 pounds per square inch for a period of approximately ten minutes and at a temperature of substantially 200° Fahrenheit, although obviously, these figures may be varied without avoiding the present invention.

Due to the characteristics of the material used, namely, a mixture comprising a resin solution and a polyglycol derivative, the laminations may be sprayed and then immediately assembled into sandwich form. That is, there is no need for drying or seasoning the deposits on the laminations as heretofore.

The monobutyl ether of diethylene glycol or other polyglycol derivative has a relatively low vapor pressure which is sufficiently low that the finished composite sheet will not develop bubbles when placed in actual use. A decided advantage in the present process is that the sheets of glass and non-brittle plastic material can be sprayed in one operation, immediately assembled to produce the sandwich, and because of the slight surface plasticization of the non-brittle plastic sheet, it will become tacky causing the laminations of the sandwich to adhere slightly to one another so that slippage between the laminations is not encountered when in the press. Further, because the right amount of liquid can readily be sprayed and the sheets assembled in sandwich form before pressing, the sandwich can be set aside before pressing for varying times without affecting the quality of the bond. In other words, due to the characteristics of the liquid mixture, the laminations can be sprayed with such mixture and then arranged in sandwich form. The sandwich can be placed in a press a minute or two after its formation or its entrance into the press can be delayed for as much as an hour and the finished sheet will not differ, at least noticeably differ, from the sheet formed from the sandwich pressed within two or three minutes after its assembly.

I have found that a sheet of laminated glass produced in accordance with the above will be relatively free from wavy appearance. Although there may be reasons, of which I am not aware, as to why this process and use of this liquid mixture will give such a desirable sheet, I am of the opinion that the presence of monobutyl ether of diethylene glycol or other polyglycol derivative in the mixture and the method of application thereto causes a slight pitting of the celluloid when sprayed thereon. As a matter of fact, the spray is so controlled as to size and speed that this slight pitting is purposely permitted. The consequent roughing of the surfaces upon which the liquid is deposited is believed to have a considerable bearing on the appearance of the finished sheet, and in the present case a proper control of the spray gives a very satisfactory commercial product.

There are two aspects as to the question of wavy appearance in laminated glass. First, the nature of the laminated sheet may be such as to merely accentuate the waves already present in the glass sheets used; and secondly, additional waves may be introduced into the sheets by deflection thereof during the making of the laminated glass. Laminated glass made in accordance with the above does not seem to accentuate the waves already present in the glass sheets, nor is it believed that additional waves are introduced into the sheet during its manufacture.

Although the mixture when properly sprayed will pit or bite the surface of the non-brittle sheet, the liquid does not cause any apparent flowing of the non-brittle sheet, and therefore the tendency toward after cracks is not encountered. As above stated, the surfaces of the plastic sheet are purposely pitted slightly or roughened, but it will be understood that such treatment does not adversely affect the transparency of the finished sheet or clearness of vision therethrough.

Fig. 5 illustrates the finished sheet formed from the sandwich of Fig. 3, although obviously the various films have been greatly exaggerated for the purpose of illustration as in actual practice there is a very slight film only left between the glass sheets and non-brittle membrane. Fig. 6 is a view similar to Fig. 5 but of a different type of product, while Fig. 7 discloses the use of a seal 22 designed to protect the bond between the laminations.

Although I have set forth exact percentages of ingredients mixed together, it will, of course, be understood that the invention is not limited to the specific quantities or specific ingredients. For instance, diethyl oxalate does not necessarily have to be used as the medium in which the further reaction of the resin takes place. Likewise, a solvent similar to cello-solve can be substituted therefor without defeating the present invention. What is required, however, is the use of a properly reacted resin in solution form mixed with a polyglycol derivative.

The invention as above described makes no mention of the use of skin coats on the glass sheets, but such can be used if desired. For instance, before deposit 12 is sprayed upon the glass sheets, they may be sprayed with a suitable skin coat solution such as a cellulose composition material. If this is done, the skin coat deposit is allowed to dry to produce a closely adherent skin coat. The deposit 12 is then sprayed on the skin coat instead of directly upon the glass and the spray is preferably so controlled that the skin coat is pitted in the same manner as the non-brittle sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. As a new article of manufacture, a sheet of laminated glass comprising two sheets of glass and an interposed sheet of non-brittle material treated with a mixture of a synthetic resin and a polyglycol derivative.

2. As a new article of manufacture, a sheet of laminated glass comprising two sheets of glass and an interposed sheet of non-brittle material treated with a mixture of a polyhydric alcohol-polybasic acid resin and a polyglycol derivative.

3. As a new article of manufacture, a sheet of laminated glass comprising two sheets of glass and an interposed sheet of non-brittle material treated with a mixture of a synthetic resin and monobutyl ether of diethylene glycol.

4. As a new article of manufacture, a sheet of laminated glass comprising two sheets of glass and an interposed sheet of non-brittle material treated with a mixture of a polyhydric alcohol-polybasic acid resin and monobutyl ether of diethylene glycol.

Signed at Toledo, in the county of Lucas and State of Ohio, this 9th day of April 1929.

GEORGE B. WATKINS.